July 31, 1962  A. W. DUNCAN  3,047,131
BELT CONVEYORS
Filed Sept. 1, 1959  4 Sheets-Sheet 2
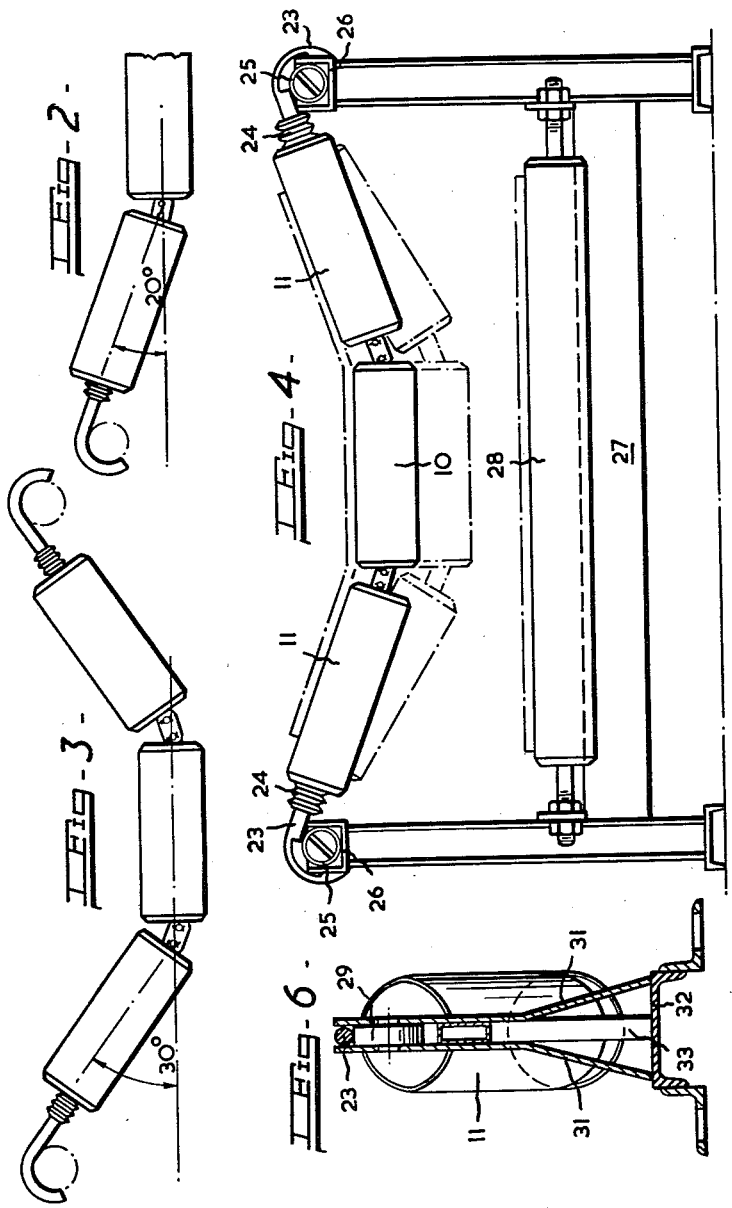

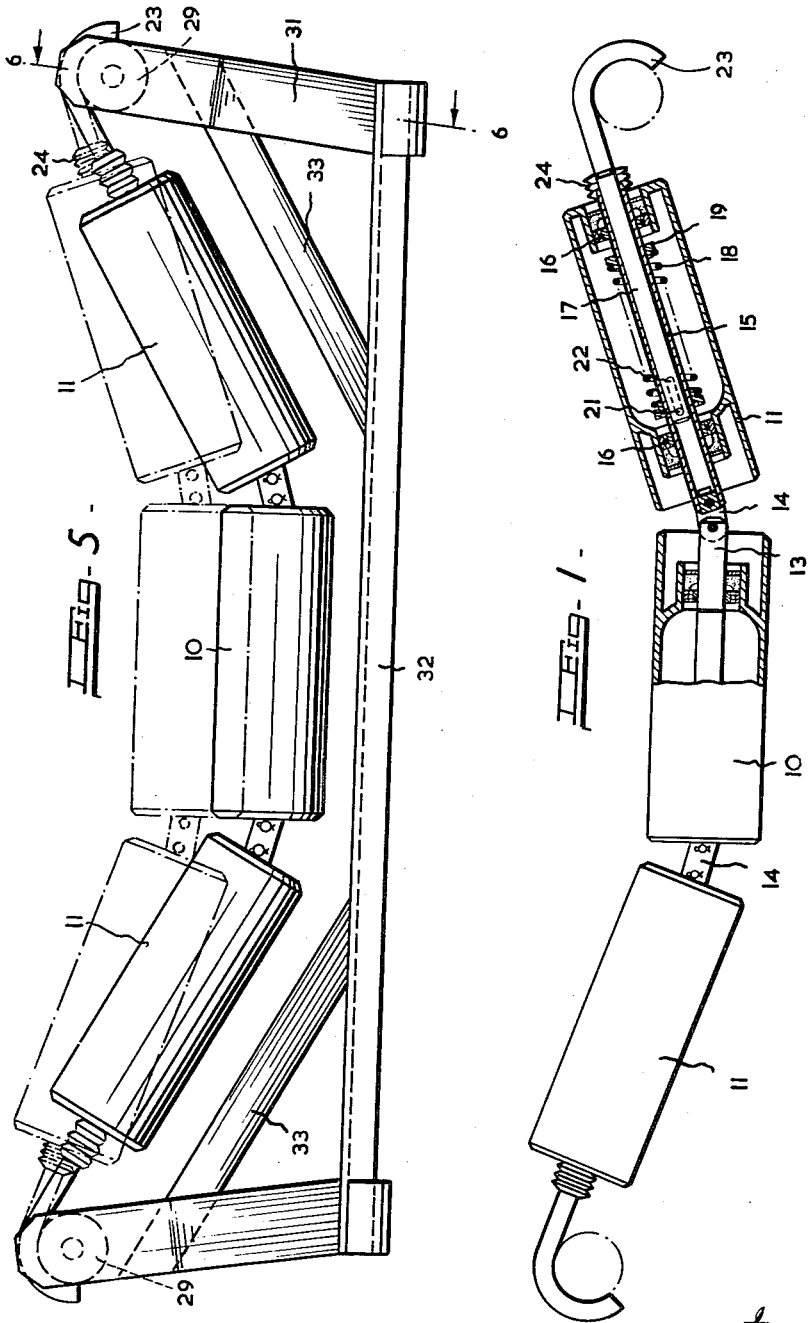

July 31, 1962  A. W. DUNCAN  3,047,131
BELT CONVEYORS
Filed Sept. 1, 1959  4 Sheets-Sheet 3
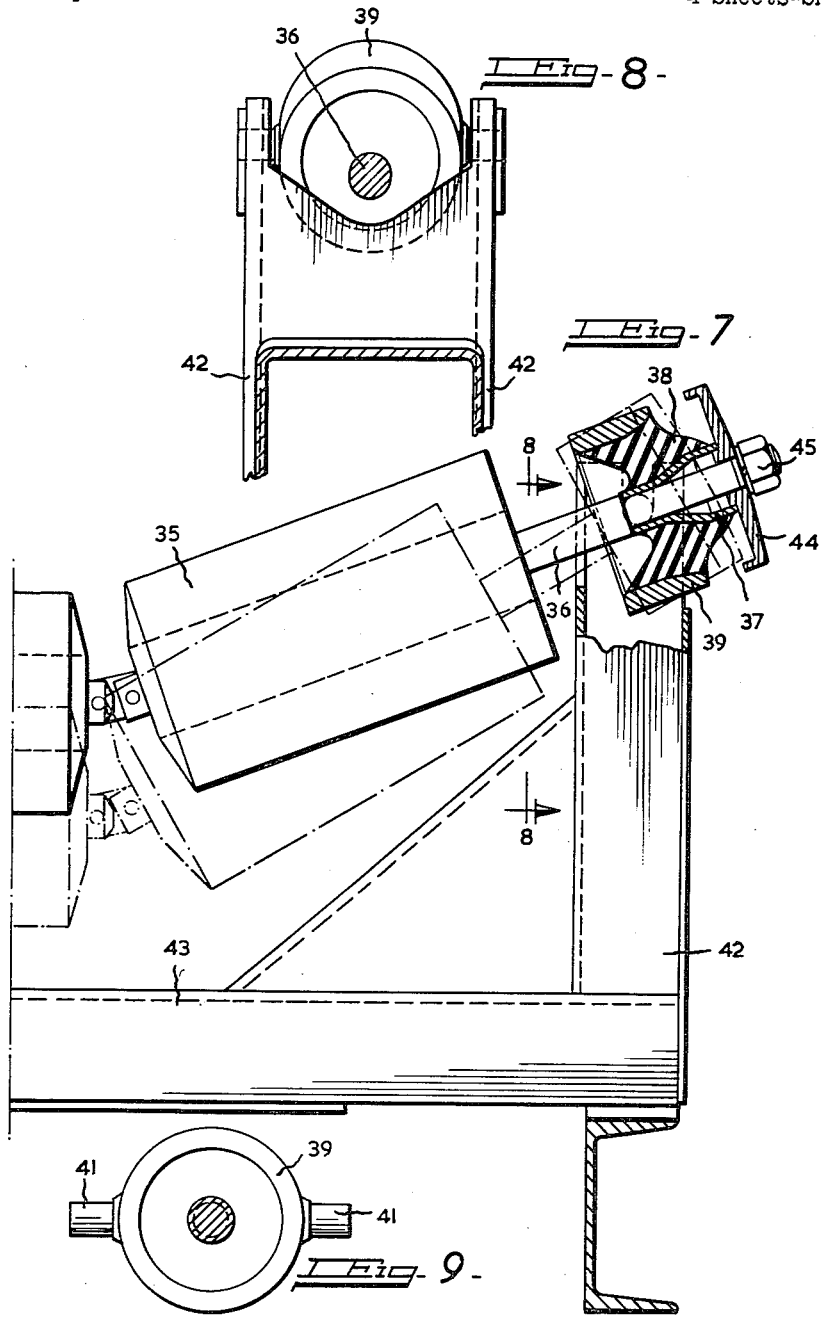

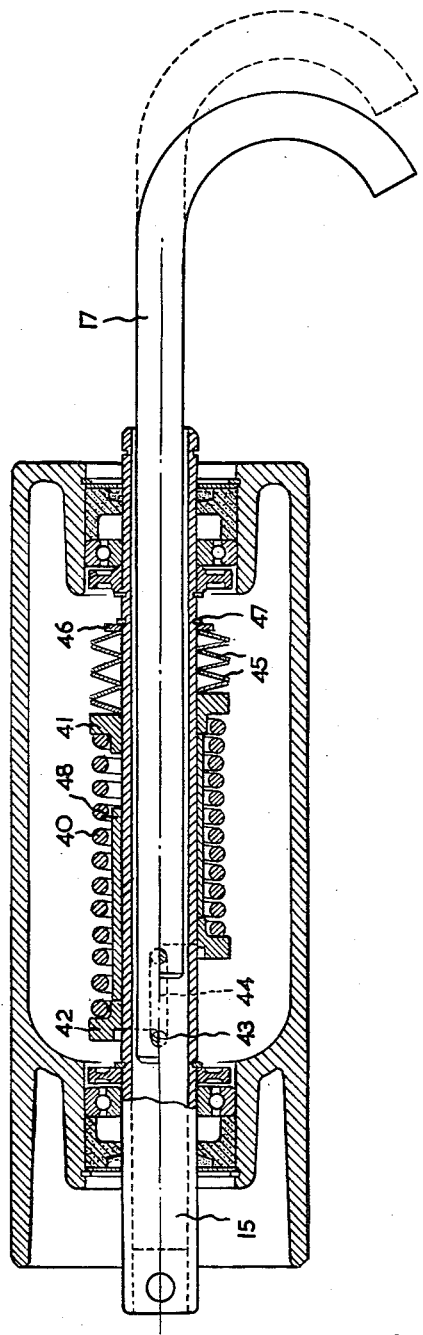

United States Patent Office 3,047,131
Patented July 31, 1962

3,047,131
BELT CONVEYORS
Angus Wellesley Duncan, Leigh Sinton, near Malvern, England, assignor to The Mining Engineering Company Limited, Meco Works, England, a British company
Filed Sept. 1, 1959, Ser. No. 837,513
Claims priority, application Great Britain Sept. 27, 1958
5 Claims. (Cl. 198—192)

This invention relates to improvements in belt conveyors of the self-troughing type in which a belt is supported on spaced idlers suspended between spaced supports which may be individual frames or may be longitudinal stringers which are supported at intervals by rigid frames or stools.

The idlers may for example comprise rollers rotatably mounted on short rigid spindles of which the adjacent ends are pivotally connected to allow the assembly to flex in a vertical plane, the outer ends of the spindles of the outer rollers being coupled to the stringers or other supports. In some conveyors of this type stringers are formed by flexible ropes or cables which can yield inwardly towards each other to allow the troughing of the idlers to increase when the belt is loaded.

According to our invention, in a self-troughing conveyor incorporating idler assemblies each comprising rollers rotatably mounted on spindles of which the adjacent ends are pivotally connected, the spindles of the outer rollers are pivotally connected to stationary supports by couplings which are extensible against spring loading.

Thus under increased load on the belt these couplings can extend axially and the spindles of the outer rollers can move angularly about the supports to allow the troughing angle of the idler to increase in proportion to the load.

The couplings can be of various forms, and the springs can be located within the idler rollers themselves where they are effectively protected.

Some practical forms of troughed idler assemblies incorporating our invention are illustrated by way of example in the accompanying drawings in which:

FIGURE 1 is a front elevation of one form of idler,
FIGURES 2 and 3 are diagrammatic elevations on a smaller scale of the idler showing the extreme positions of the rollers,
FIGURE 4 is a front elevation of an idler mounted on a support,
FIGURE 5 is a similar elevation showing an idler mounted on a different type of support,
FIGURE 6 is a vertical section on the line 6—6 of FIGURE 5,
FIGURE 7 is a front elevation in part section of one end of an idler incorporating a different form of extensible coupling,
FIGURE 8 is a section on the line 8—8 of FIGURE 7,
FIGURE 9 is an end view of a trunnion forming part of the coupling shown in FIGURE 7,
FIGURE 10 is a longitudinal section of a side roller incorporating two springs of different strength, the upper half of the section showing the parts in their unloaded positions and the lower part showing them in their fully loaded positions.

The idler shown in the drawings comprises three rollers, a central horizontal roller 10, and two oppositely inclined side rollers 11. The central roller is rotatably mounted on ball bearings 12 on a rigid spindle 13 of which the ends are hingedly connected by short links 14 to the inner ends of the spindles of the side rollers.

The spindle of each side roller is formed by a rigid tubular member 15 on which the roller is rotatably mounted on ball bearings 16 which are sealed by felt washers or other seals in the usual way. A cylindrical bar 17 is slidably mounted in the outer end of the hollow spindle 15 and is loaded by a compression spring 18 fitting over the spindle and abutting between a collar 19 welded or otherwise fixed on the spindle on the inner side of the outer bearing and a transverse cotter 21 fixed in the bar 17 near its inner end and projecting through aligned longitudinal slots 22 in the spindle.

The length of the slots 22 determines the permitted axial movement of the bar 17 relative to the hollow spindle and hence the maximum troughing angle which the idler can assume under load.

The outer end of the bar 17 is curved round into the form of a hook 23 for engagement with a support about which it can move angularly, the axis of movement being substantially at right angles to the plane of the idler.

The hollow spindle 15 with the bar 17, spring 18, and cotter 21 can readily be assembled as a complete unit and then inserted into the roller by normal assembly methods.

The sliding joint between the bar 17 and the outer end of the hollow spindle 15 is preferably protected by a synthetic rubber or plastic bellows 24 or equivalent sealing means to prevent the entry of dust or grit which might cause jamming of the bar or introduce undue resistance to movement.

In an alternative arangement the outer end of the bar 17 may be formed into an eye for engagement with a hook on a support.

When a belt supported by the idler is not loaded the spring 18 will hold the cotter 21 at the inner end of the slots 22 and the relative positions of the rollers will be as shown in FIGURE 1. When the belt is loaded the springs in the outer rollers yield and the effective length of the idler and the troughing angle increases automatically with load, the bars 17 moving angularly about the supports.

For normal use in supporting the load carrying run of a conveyor belt, the inclination of the axes of the side rollers 11 to the horizontal when the belt is not loaded may conveniently be about 20° as shown in FIGURE 2, and the maximum inclination when the belt is fully loaded may be about 30° as shown in FIGURE 3. The maximum inclination is determined by the length of the slots 22 in the hollow spindles of the side rollers.

When the idler is used as a cushion idler at points where material is loaded on to the belt and the belt may be subjected to the impact of considerable masses of material, there may be two springs between the bar 17 and the spindle 15, a light spring to take normal loading and a shorter heavy spring coming into action over the last part of the yielding movement to take excessive shocks.

One example of such an arrangement is shown in FIG. 10 of the accompanied drawings, which shows a side roller in longitudinal section. The bar 17 which is axially slidable in the hollow spindle 15 of the roller is loaded by two springs of different strengths. The lighter spring is a coiled compression spring 40 fitting over the spindle 15 and abutting between a collar 41, which is axially slidable on the spindle, and a similar collar 42 bearing on a transverse cotter pin 43 fixed in the bar 17 adjacent to its inner end and projecting through aligned longitudinal slots 44 in the spindle. The heavier spring comprises a stack of Belleville washers 45 fitting over the spindle between the collar 41 and an abutment washer 46 located on the spindle by a spring ring 47 fitting into an annular groove in the spindle.

A sleeve 48 of a length less than that of the coiled spring 40 in the unloaded condition of the idler is slidably mounted on the spindle within the spring 40 and between the collars 41 and 42.

When the roller assembly is under load, the bar 17 moves outwardly relative to the spindle and this movement is resisted initially by the two springs acting in series, the major part of the movement being accommodated by compression of the lighter spring 40. If the load goes on increasing, the movement continues until the sleeve 48 is forced by the collar 42 into engagement with the collar 41, as shown in the lower half of FIGURE 4. Any further movement is then resisted by the heavier spring formed by the Belleville washers 45 which provide heavy spring resistance to the last part of the movement.

In an alternative construction in which the roller is a steel shell carried by end rings the spring may be formed by Belleville washers mounted on a bar slidable through the outer end ring.

In the idler assembly shown in FIGURE 4 the hooked ends 23 of the bars slidable in the hollow spindles of the outer rollers are engaged over rigid tubular longitudinal members or stringers 25 suppported at intervals in brackets 26 carried by transverse frames or stools 27. These frames or stools also carry cylindrical rollers 28 for the return run of the belt.

In the assembly shown in FIGURES 5 and 6, the hooked ends 23 of the bars are engaged over cylindrical members 29 mounted between spaced vertical bars 31 welded to a base 32 and braced by struts 33.

In the alternative construction shown in FIGURES 7 to 9, each outer roller 35 of an idler is rotatably mounted on a rigid spindle 36 of which the outer end extends for some distance from the roller. The outer part of the spindle is reduced in diameter and is received in a tapered metal sleeve 37 bonded to the inner surface of a frusto-conical rubber bush or annulus 38. The outer surface of the rubber bush is bonded to the inner surface of an internally tapered cylindrical housing 39 having opposed trunnions 41 which are received in bearings in the spaced side plates 42 of pillars forming part of a rigid support 43, the axis of the trunnions being horizontal and at right angles to the plane of the idler. A flanged abutment disc 44 is mounted on the outer end of the spindle 36 on which it is secured by a nut 45, the sleeve 37 being clamped between the disc 44 and the shoulder at the inner end of the reduced part of the spindle.

The parts are shown in full lines in the unladen condition in FIGURE 7. When the belt is loaded the spindle 36 can move axially inwards against the resilient resistance offered by the bush 38 to allow the troughing angle to increase as shown in dotted lines. In the first part of the movement the rubber or the bush is operating in shear and the resistance to movement is relatively small, but as the movement increases the rubber is compressed radially between the inner sleeve 37 and the housing 39 and the resistance increases progressively.

A limit to the inward movement of the spindle 36 is provided by the engagement of the disc 44 with the outer end of the housing 39.

I claim:

1. An idler for a self-troughing belt conveyor comprising a plurality of rollers having their axes substantially in a common plane and having their adjacent ends hingedly connected, suspension members mounted for sliding axial movement in the outermost rollers and adapted to be pivotally connected at their outer ends to stationary supports, said outermost rollers having substantially enclosed hollow cavities, bearing means extending axially through the ends of said outermost rollers adjacent the outer ends of said suspension members for slideably supporting said members, and spring means enclosed entirely within the cavities and connected to said suspension members and said rollers so as to resiliently resist axial movement of said rollers relative to said members.

2. An idler for a self troughing belt conveyor comprising a plurality or rollers rotatably mounted on rigid individual spindles having their axes substantially in a common plane, the spindle of each outermost roller being hollow, hinged connections between the adjacent ends of the spindles of adjacent rollers, a bar axially slidable in the hollow spindle of each outermost roller and adapted to be pivotally connected at its outer end to a stationary support, and spring means housed within said outermost roller resiliently resisting axial movement of said spindle relative to said bar.

3. An idler as in claim 2 wherein said spring means comprise a spring mounted on the hollow spindle within the roller, said spring abutting between a collar fixed on the spindle and a cotter fixed in the bar and projecting through opposed-aligned longitudinal slots in the spindle.

4. An idler as in claim 2 wherein said spring means comprise a light spring to take normal lodaing on the idler and a shorter heavy spring coming into action over the last part of the inward movement of the spindle to take excessive shocks.

5. An idler as in claim 2 wherein said hinged connections between the adjacent ends of the spindles of adjacent rollers comprise short links pivotally attached to the ends of the spindles.

References Cited in the file of this patent

UNITED STATES PATENTS

| 754,335 | McCabe | Mar. 8, 1904 |
| 909,833 | Vrooman | Jan. 12, 1909 |
| 1,222,480 | Smith | Apr. 10, 1917 |
| 2,295,907 | Lewis | Sept. 15, 1942 |
| 2,781,124 | Troller | Feb. 12, 1957 |

FOREIGN PATENTS

| 890,337 | France | Nov. 2, 1943 |
| 726,577 | Germany | Sept. 3, 1942 |